United States Patent [19]
Marion et al.
[11] 3,838,291
[45] Sept. 24, 1974

[54] DETECTOR INDICATING AVAILABILITY AND POSITION OF TAPE

[75] Inventors: Andre F. Marion; George N. Kaposhilin, both of Palo Alto, Calif.

[73] Assignee: Hewlett-Packard Company, Palo Alto, Calif.

[22] Filed: May 17, 1973
(Under Rule 47)

[21] Appl. No.: 361,357

[52] U.S. Cl. .................. 250/571, 250/216, 250/561, 179/100.2 S
[51] Int. Cl. ................................................ G08c 9/06
[58] Field of Search... 250/219 D, 219 DC, 219 FR, 250/219 DR, 571, 548, 561, 570, 216; 179/100.2 S; 340/174.1 R, 174.1 C

[56] References Cited

UNITED STATES PATENTS

| | | | |
|---|---|---|---|
| 2,971,716 | 2/1961 | Sampson | 250/219 FR X |
| 3,431,426 | 3/1969 | Laidlaw | 250/219 D |
| 3,443,109 | 5/1969 | Broom et al. | 250/219 D X |
| 3,461,302 | 8/1969 | Benson et al. | 250/219 DR |
| 3,557,380 | 1/1971 | Matthews | 250/219 DR |

*Primary Examiner*—Walter Stolwein
*Attorney, Agent, or Firm*—Patrick J. Barrett

[57] ABSTRACT

A tape detector operates inside an information recording and retrieving system structure. In the detector, a lense-equipped light source located inside a housing produces three beams of light which, after crossing above, below, and through an ordinary commercial recording tape, pass through an optical prism where they are deflected back toward the light source housing. On their return, the light beams again cross above, below, and through the tape and then converge on the surfaces of three photodetectors arranged in a vertical line in the same housing as and adjacent to the light source. Signals from the photodetectors indicate the following: the upper photodetectors signal whether the tape is available for recording, the middle one signals a particular position of the tape such as the beginning or the end of the tape, and the lower one signals the presence or absence of a tape cartridge within the system structure.

10 Claims, 10 Drawing Figures

DETECTOR INDICATING AVAILABILITY AND POSITION OF TAPE

BACKGROUND AND SUMMARY OF THE INVENTION

Certain known storage systems use tapes to store information, in digital form, for instance. Such tapes are placed within cassettes or cartridges for safeguarding and convenience in storage. The cartridge containing the tape may be inside a case or structure which contains the means to circulate the tape, to transfer information to the tape, and to provide the power with which to run the information system. Because the tape is inside a cartridge and the carriage is inside a supporting structure, the user faces several problems. It may be necessary to find out: first, the exact position of the beginning of the tape or the end of the tape or that of any other particular place along the tape; second, whether the information already in the tape must be protected, and third, whether there is a cartridge inside the case or supporting structure.

Prior solutions employed photoelectric means to detect the beginning and the end of the tape and bulky mechanical switches to indicate the presence or absence of a cartridge and to protect information already stored in the tape. Using these mechanical switches turned out to be an undesirable solution, because they wear out, collect dust and dirt, produce bad electrical contacts, and require regular maintenance to keep them working properly.

In order to solve the above-mentioned problems, the invention uses optoelectrical means which are inexpensive, effective, reliable and over-all very compact. This object is accomplished in accordance with the preferred embodiment of this invention whose main elements are: a light source, lenses for controlling the source beams, a tape with which these rays interact, a prism to deflect the beams, photodetectors to detect the beams, and a shutter. The light source, which could be a light emitting diode, for example, produces rays that first pass through lenses which collimate them into three distinct and separate beams. The middle beam passes through a first pinhole in the cartridge tape, the upper beam passes above, and the lower beam below the tape. These three beams strike a triangular lens-equipped deflecting prism which deflects them 180° toward the tape. On their return, the middle beam passes through a second pinhole in the tape and the other beams pass above and below the tape just as they did before. Finally, each beam strikes one of the three photodetectors that are adjacently located along a vertical line proximate to the light source. The middle beam detects the positio of the tape, the upper beam indicates a clean tape ready for recording, and the lower beam shows the presence of a cartridge within the structure containing the information system.

The light source and the three photodetectors are all located within a housing unit which provides an individual orifice for each of these four elements. The terminals of these elements are connected to a printed circuit board which is attached to the back face of the housing and closes one end of all the above orifices. The tape located inside the cartridge is positioned in front of the light source housing between the housing and the prism. The prism is mounted on the bottom plate of the tape cartridge which, in turn, is positioned inside the structure that contains the information recording and retrieving means. The prism and the light source housing are on the same plane and have approximately the same height.

DESCRIPTION OF THE PREFERRED EMBODIMENT

Figure 1:
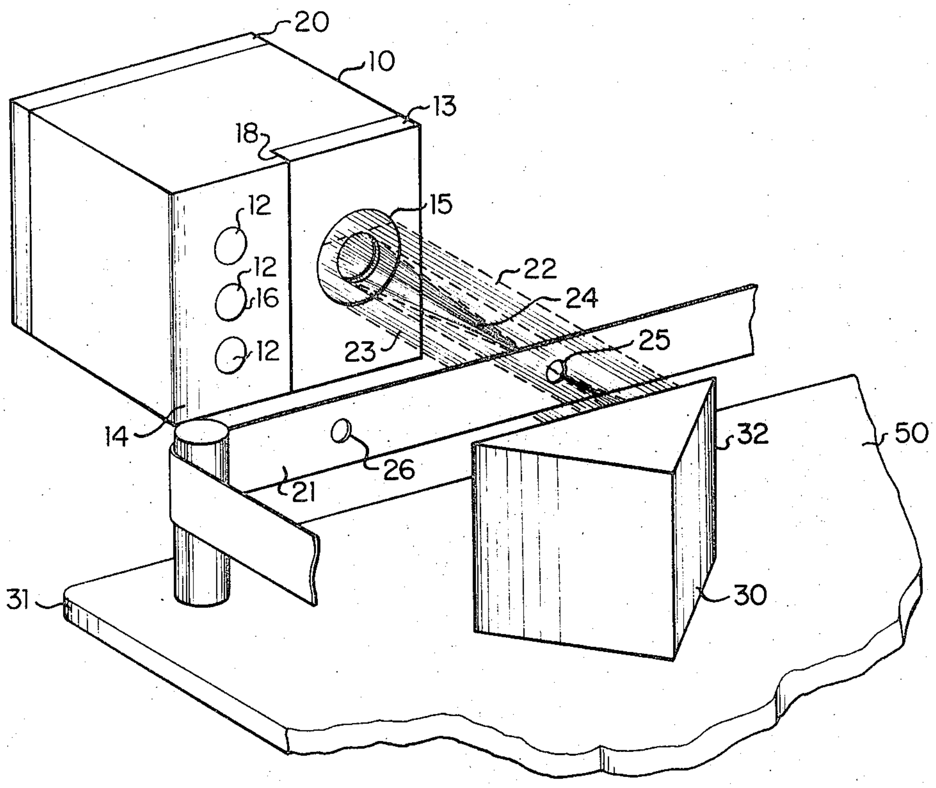
FIG. 1 shows the front of the housing displaying the light source, photodetectors, beam-forming optical lens, the printed circuit board, tape, and prism.
Figure 2:
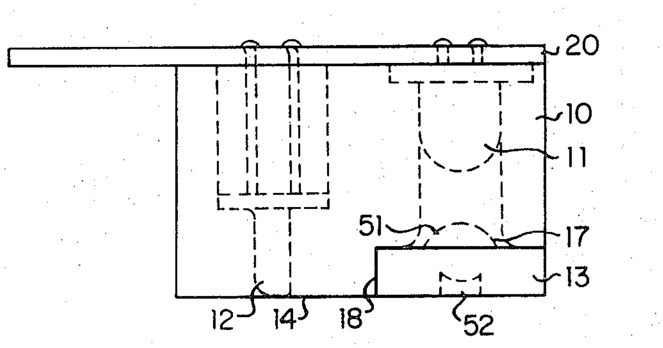
FIG. 2 is a top view of the housing.
Figure 3:
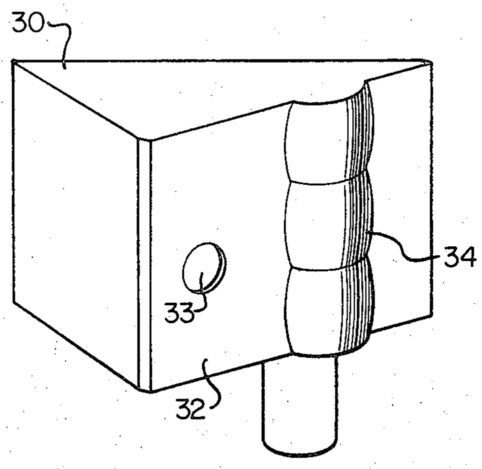
FIG. 3 is a front view of the prism showing the entrance and exit lenses.

FIGS. 1 and 2 show a rectangular housing block 10 made fo opaque plastic, such as black Delrin, or metal and contains a light source 11, three photodetectors 12, and a beam-forming lens piece 13 on top of the light source. For example, the housing shown in the illustrated embodiment has the general dimensions of 16 × 13 × 11 mm. The front 14 of the housing faces a tape 21 and a prism 30 and has on its right side a circular orifice 15 for the light source 11, and on the left side, three elliptical orifices 16 for the three photodetectors 12. The back of the housing is closed by a printed circuit board 20 which receives the electrodes of the electrical components in the housing.

The light source orifice has a surface opening 17 which is 7 mm in diameter in the illustrated embodiment and is funnel shaped in order to help diverge the light source rays. This opening is located a step 18 recessed from the other side of the housing front although it could be at the same level. On this step and on top of the light source there is placed a lens piece 13 having two lenses 51 and 52 capable of forming two distinct and separate beams of light. The lens piece is cemented to the housing. In the embodiment shown, the light source itself is located optionally at about 4 mm below the surface of the housing front. The three photodetector orifices are about 2 mm in height and are located one right next to the other, here one millimeter away from one another on a vertical straight line. The shape of the orifice surface opening is elliptical although it could be another shape such as circular or square. The photodetectors are contained inside these orifices and have their top surface at about the same level as the surface of the housing front. In relative positions the light source is adjacent and to the right of the central photodetector, although it could be located to the left of it. The position of the outer photodetectors depends on the width of the tape 21 becuase the outer beams of light must pass one above and the other below the tape. A common tape width is 3.8 mm and it has been found desirable to space the detectors approximately 2.5 mm or more apart when used with a 3.8 mm tape.

The light source located at the local point of the center lens piece is a light emitting diode operating in the infrared region at about 700 nanometers, because gallium arsenide light emitting diodes are most effective in this range. A typical light source is about 4–5 mm in diameter. The shape of the light source is circular but it could be another shape such as square. The source fits inside the light source orifice and in the illustrated embodiment is about 4 mm below the surface of the front of the housing.

The light source can be operated from a DC source or from a pulsating one. There are, however, a number of benefits resulting from pulsating the source. For instance, the instantaneous light output is increased, pulsed light can be easily differentiated from ambient light, pulse signals from the photodetectors are easier to amplify and process, and, finally, power needs are substantially reduced.

The three photodetectors are conventional and they must operate in the same wavelength range as the light source, i.e. 700 nanometers for the light source described above. The diameter of the photodetectors used in the illustrated embodiment is about 3 mm, and they fit into the photodetector orifices on the front face of the housing. The central photodetector senses light rays coming directly from the middle of the tape and the outer ones sense light rays coming just below and just above the tape respectively. The distance between the photodetector line and the light source sets the distance between two pinholes on the tape and also the distance between incoming and outgoing lenses on the prism.

A printed circuit board 20 made of fiberglass, for example, closes the back of the orifices in which the photodetectors and the light source are contained and also receives the terminals from these units. A plastic screw may be used to fasten this board to the housing.

A glass or plastic lens piece 13 positioned in front of the light source forms two outer beams of light 22, 23 which are parallel to each other and pass above and below the tape respectively. A middle beam 24 coming from the middle of the source, however, converges onto a first pinhole 25 in the tape passing in front of both the light source housing and prism. The tape 21, located in front of and between the housing 10 and the prism 30, in an ordinary recording tape housed in a preferably translucent, commercially available cartridge 50. This cartridge, however, could be made of opaque materials and have a window through which the source light rays pass.

Two pinholes 25, 26 which pierce the tape are located along its longitudinal axis or on any straight line along the tape at a place whose position one desires to know, such as the beginning or the end of the tape. As already mentioned, the distance between pinholes is the same as the distance between the photodetector line and the light source. Although the pinhole line may be in the middle of or at any other position along the tape, it must be directly in front of the middle photodetector, because light rays returning through the second pinhole must be sensed by this photodetector.

Figure 8:
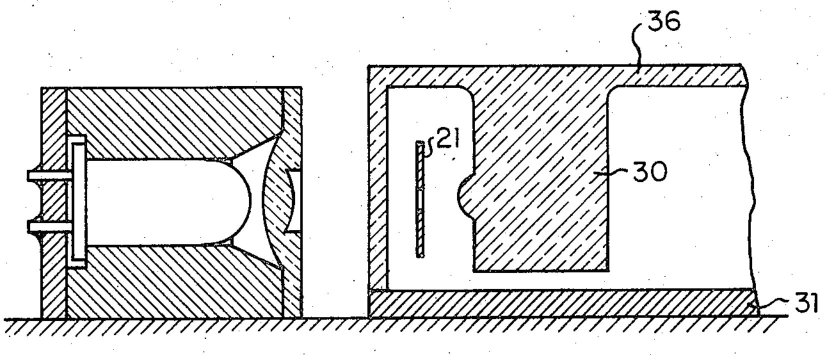
FIG. 8 shows a prism mounted inside the tape cover.
Figure 9:
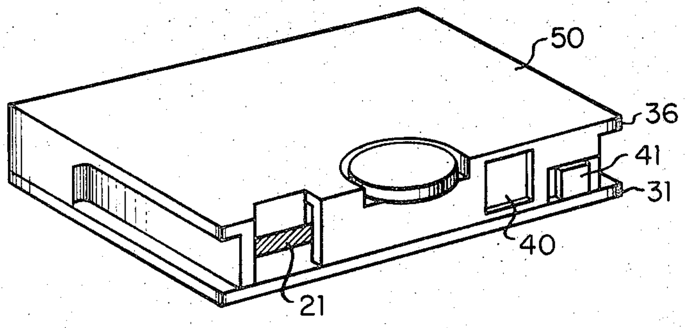
FIG. 9 shows a cartridge where the prism is located.

As shown in FIG. 1 a short distance away from the housing 10, about 5 mm in the illustrated embodiment, and directly in front of it, there is a triangular prism 30 standing on a base plate 31 of the tape cartridge. Such prism could be also molded inside a plate cover 36 placed on top of the same cartridge as shown in FIG. 8. The prism shown in FIG. 1, is made of a good light conductor such as glass or acrylic resins, like Lucite, and must have sufficient height to intercept the light beams from the source. These light beams first enter the prism base 32 which faces the tape and the light source. The prism receives the light beams from the source, deflects them 180° and returns them back toward the tape 21 and housing 10. As the beams reach the base 32 of the prism, only the upper and lower beams are parallel to each other and collimated. The central beam, which converged to the first pinhole on the tape, begins to diverge as it reaches the prism. For this reason, a control lens 33 is placed on the base 32 of the prism, in front of the middle rays in order to produce collimated central beam. Thus, the three beams are parallel to each other as they pass through the prism. Lenses 34 are placed at the point where these beams emerge from the prism base in order to converge each beam on the surface of a photodetector.

Figure 4:
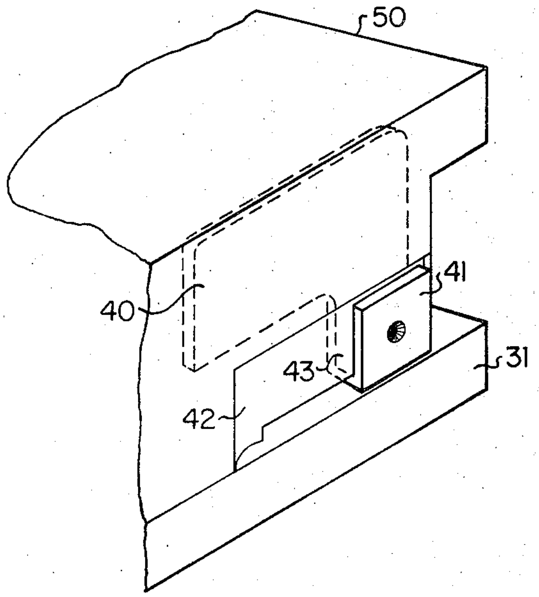
FIG. 4 shows the shutter mounted on the cartridge wall.
Figure 5:
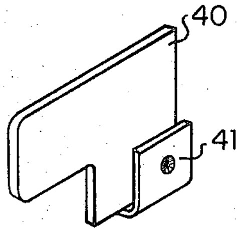
FIG. 5 is an isolated view of the shutter.
Figure 6:
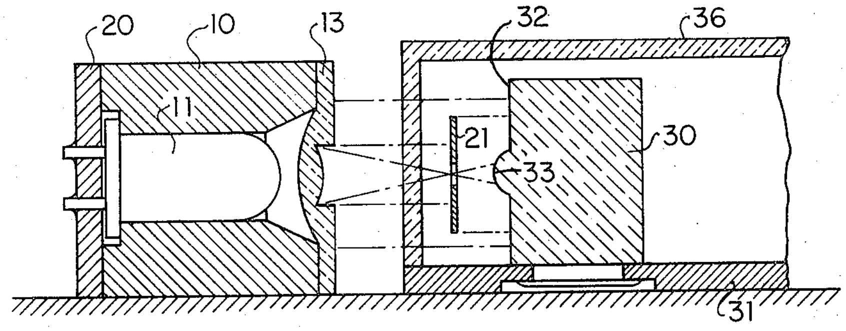
FIG. 6 shows a cut through the light source and also the relative positions of the housing and prism as it stands on the base plate of a tape cartridge.
Figure 7:
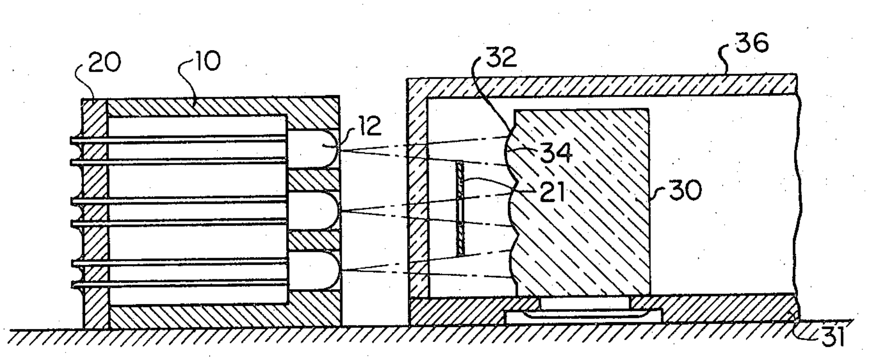
FIG. 7 shows a cut through the photodetector and also the same relative positions of the housing, the prism and the tape cartridge.
Figure 10:
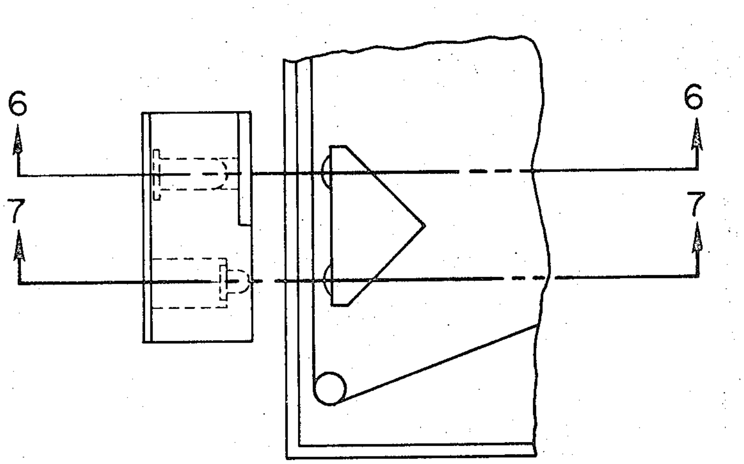
FIG. 10 shows a top view of the housing, prism tape and cartridge.

FIGS. 4 and 5 show a flat, rectangular shutter 40 made of metal or plastic which is opaque in the light range of the source. One of the lower corners of the rectangular shutter has been cut-off to permit the middle and lower beams to reach the middle and lower photodetectors, and the other corner has a U-shaped clip 41 which can be formed by bending a lower portion of the shutter into a U.

The manually operated shutter is positioned on the inside of the cartridge wall 43 between the light source housing 10 and the prism 30 while the V-clip bends under the wall and presses snugly into an indentation 42 located outside the same wall. The length of the indentation controls the travel of the shutter, because the shutter clip can move only within the indentation. In the preferred embodiment the shutter can move within the indentation to a place where it prevents the upper beam 22 coming above the tape from reaching the upper photodetector, called the "file protect detector", while permitting the passage of the middle and lower beams.

To record or retrieve information, a transducer contacts the tape through an opening in the tape cartridge front wall. To circulate the tape, a friction wheel holds the tape against a driving wheel located inside the cartridge through an opening in the same cartridge wall. A DC or AC power source similar to those used in commonly available tape recorders provides the power to operate the system.

This tape detector system operates as follows. The light source produces three beams of light. The upper beam, called the file protect beam, passes above the tape, hits the prism and returns towards the light source housing, passing again over the tape. The upper beam is thereupon detected by the upper photodetector, but only if the shutter does not block its path. Thus the position of the manually operated shutter serves to signify whether or not the tape is available for recording. If the shutter is in front of the upper photodetector, then no beam reaches it and this signifies that the file must be protected and no recording should be made on the tape.

The middle beam, called beginning of tape or end of tape beam, after going through the first pinhole on the tape is deflected by the prism and goes back towards the housing and passes through the second pinhole in the tape, whereupon it is detected by the central photodetector. Because the two pinholes are always placed on a known position on the tape, for example, the beginning, a signal from the central photodetector signifies that the tape is at that position, in this example, the beginnning.

The lower beam, called a cartridge detect beam, passes under the tape, hits the prism and is deflected and goes back toward the housing. Then it passes under the tape again and is detected by the lower photodetector, but only if the cartridge is inside the information recording system, because the deflecting prism is mounted inside the cartridge.

We claim:

1. An electro-optical detector for use with a tape in a tape transport mechanism, the detector comprising:

a light source supported in the transport mechanism for generating a light beam;

a plurality of photodetectors supported in the transport mechanism; and an optical reflector disposed in front of the light source for reflecting the light beam from the light source to the photodetectors, a first portion of the light beam passing from the light source to a photodetector through a hole provided in the tape for detecting a first condition, a second portion of the light beam passing from the light source to a photodetector above the tape for detecting a second condition and a third portion of the light beam passing from the light source to a photodetector below the tape for detecting a third condition.

2. An electro-optical detector as in claim 1 wherein there is a housing mounted in the transport mechanism for supporting the light source and the photodetectors; and there are three photodetectors disposed on a vertical line on a face of the housing, each receiving a different portion of the light beam and wherein the source is in the middle of and to one side of the photodetector line.

3. An electro-optical detector as in claim 2 wherein the light source side of the housing face has a lens for splitting the light rays from the source into three light beams.

4. An electro-optical detector as in claim 3 wherein the tape has a first and second hole and the optical reflector is a prism which has a collimating lens located to receive the first portion of the light beam passing through the first of the holes in the tape.

5. An electro-optical detector as in claim 4 wherein the prism has three exit lenses disposed in a vertical straight line, the middle lens being located to receive the first portion of the light beam passing through the second of the holes in the tape.

6. An electro-optical detector as in claim 5 wherein the light source is a light emitting diode powered by a pulsating source.

7. An electro-optical detector as in claim 5 wherein the tape is contained in a cartridge and the prism and the lenses in the prism are molded into a cartridge cover, the prism being located near a wall of the cartridge which faces the light source and the photodetectors.

8. An electro-optical detector as in claim 6 wherein a shutter is mounted on the cartridge wall between the prism and the housing, the shutter being movable into a predetermined position for blocking the passage of one of the second and third portions of the light beam.

9. An electro-optical detector as in claim 1 wherein the first condition is a predetermined point along the length of the tape, and one of the second and third conditions is the presence of the tape in the tape transport mechanism.

10. An electro-optical detector as in claim 9 wherein the tape is contained in a cartridge, a movable shutter is mounted on a wall of the cartridge adjacent the photodetectors for blocking one of the second and third portions of the light beam, and the other of the second and third conditions is the presence of the shutter in the path of said one of the second and third portions of the light beam.

* * * * *

UNITED STATES PATENT OFFICE

CERTIFICATE OF CORRECTION

Patent No. 3,838,291 Dated September 24, 1974

Inventor(s) Andre F. Marion and George N. Kaposhilin

It is certified that error appears in the above-identified patent and that said Letters Patent are hereby corrected as shown below:

Column 2, line 31, "fo" should read -- of --; line 66, "becuase" should read -- because --;

Column 4, line 34, "V-clip" should read -- U-clip --;

Column 5, line 8, "beginnning" should read -- beginning --.

Signed and sealed this 3rd day of December 1974.

(SEAL)
Attest:

McCOY M. GIBSON JR.
Attesting Officer

C. MARSHALL DANN
Commissioner of Patents

FORM PO-1050 (10-69)
0-160010
USCOMM-DC 60376-P69
☆ U.S. GOVERNMENT PRINTING OFFICE : 1969 O—366-33